United States Patent
Tokumaru

(10) Patent No.: US 8,717,350 B2
(45) Date of Patent: May 6, 2014

(54) INFORMATION PROCESSING APPARATUS

(75) Inventor: Takayuki Tokumaru, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 12/453,122

(22) Filed: Apr. 29, 2009

(65) Prior Publication Data

US 2010/0020067 A1    Jan. 28, 2010

(30) Foreign Application Priority Data

Jul. 25, 2008   (JP) .................................. 2008-192592

(51) Int. Cl.
    *G06T 15/00*    (2011.01)
    *G06T 15/30*    (2011.01)
    *G06T 17/20*    (2006.01)

(52) U.S. Cl.
    USPC .......................... 345/419; 345/126; 345/423

(58) Field of Classification Search
    CPC .................... G06T 2207/22021; G06T 17/20;
                         G06T 15/10; G06T 15/00; G06T 17/00
    USPC ................................................ 345/419–423
    See application file for complete search history.

(56) References Cited

U.S. PATENT DOCUMENTS

| | | | |
|---|---|---|---|
| 6,445,390 B1 * | 9/2002 | Aftosmis et al. | 345/421 |
| 6,580,428 B1 * | 6/2003 | Ryan et al. | 345/423 |
| 2007/0268248 A1 * | 11/2007 | Zilles et al. | 345/156 |

FOREIGN PATENT DOCUMENTS

| | | |
|---|---|---|
| JP | 05-250445 | 9/1993 |
| JP | 10-143682 | 5/1998 |

* cited by examiner

*Primary Examiner* — Xiao Wu
*Assistant Examiner* — Matthew D Salvucci
(74) *Attorney, Agent, or Firm* — Staas & Halsey LLP

(57) ABSTRACT

An information processing apparatus displays a shape of an object on a display device by using numerical values on a coordinate axis. The apparatus includes a calculating unit that calculates a minimum rectangular parallelepiped including the component by using numerical values indicative of a shape of the component; an outer-shape calculating unit that replaces every component constituting the object and calculates numerical values indicative of an outer shape of an object formed by collecting every replaced component into one; a determining unit that determines whether the component makes contact with the outer shape by using the numerical values indicative of the outer shape and the numerical values indicative of the shape of the component; and a displaying unit that displays on the display device an object composed of only components as making contact.

5 Claims, 8 Drawing Sheets

FIG.4
| OBJECT ID | COMPONENT ID | CAD DATA | NON-CONTACT COMPONENT |
|---|---|---|---|
| X | COMPONENT A | CAD DATA A | |
| | COMPONENT B | CAD DATA B | |
| | COMPONENT C | CAD DATA C | |
| | COMPONENT D | CAD DATA D | |
| | COMPONENT E | CAD DATA E | O |
| | COMPONENT F | CAD DATA F | O |
FIG.5
COMPONENT A → RECTANGULAR PARALLELEPIPED
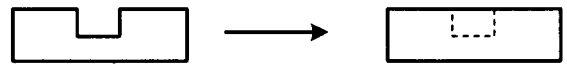
COMPONENT B → RECTANGULAR PARALLELEPIPED
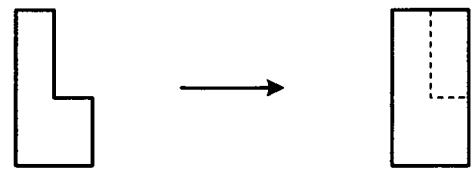
⋮
COMPONENT F → RECTANGULAR PARALLELEPIPED

COMPONENT A
COMPONENT C
COMPONENT B
COMPONENT D
COMPONENT F
COMPONENT E

INFORMATION PROCESSING APPARATUS

CROSS-REFERENCE TO RELATED APPLICATION

This application is based upon and claims the benefit of priority of the prior Japanese Patent Application No. 2008-192592, filed on Jul. 25, 2008, the entire contents of which are incorporated herein by reference.

FIELD

The embodiments discussed herein are directed to information processing apparatuses, information processing methods, and information processing programs.

BACKGROUND

For the purpose of three-dimensionally representing an object, three-dimensional Computer Aided Design (3D CAD) is used. According to the Japanese Industrial Standards (JIS) B3401, CAD is defined as "a design by generating inside of a computer a model formed of shape and other attribute data of a product for analysis and processing".

In the conventional 3D CAD, to display only the outer shape of an object, data representing the shape of the object with inner components deleted is generated by a user and is then used by an apparatus to display the outer shape of the object. Moreover, the data is generated by the user selecting components unnecessary to display only the outer shape of the object and by the apparatus deleting data regarding the components selected by the user. One known technique is a unification technique of unifying a plurality of components into one for display, thereby simplifying the object.

Examples of the conventional techniques are disclosed in Japanese Laid-open Patent Publication No. 10-143682 (pp. 1-3, FIG. 1) and Japanese Laid-open Patent Publication No. 05-250445 (pp. 1-4, FIG. 1).

Meanwhile, in the conventional techniques, it is impossible to display only the outer shape without requiring any additional data. That is, the apparatus cannot display only the outer shape unless data representing only the outer shape is generated by the user. In the unification technique explained above, the shape of the object is changed, and an outer-shape model cannot be generated.

SUMMARY

According to an aspect of the embodiment, an information processing apparatus that displays a shape of an object on a display device by using numerical values on a coordinate axis, the apparatus includes, a calculating unit that calculates, for each component constituting the object, a minimum rectangular parallelepiped including the component by using numerical values indicative of a shape of the component, an outer-shape calculating unit that replaces every component constituting the object by the rectangular parallelepiped calculated by the calculating unit and calculates numerical values indicative of an outer shape of an object formed by collecting every replaced component into one, a determining unit that determines for each component whether the component makes contact with the outer shape by using the numerical values indicative of the outer shape calculated by the outer-shape calculating unit and the numerical values indicative of the shape of the component, and, a displaying unit that displays on the display device an object composed of only components determined as making contact by the determining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a drawing for explaining a CAD-data storage unit 201 in the first embodiment;

FIG. 5 is a drawing for explaining a rectangular-parallelepiped calculating unit in the first embodiment;

DESCRIPTION OF EMBODIMENTS

Embodiments of the information processing apparatus, information processing method, and information processing program will be explained in detail below With reference to the accompanying drawings. In the following, the general outline, configuration, and process flow of an information processing apparatus according to a first embodiment are sequentially explained, and then other embodiments are explained.

[First Embodiment]

[General Outline of the Information Processing Apparatus]

Figure 1:
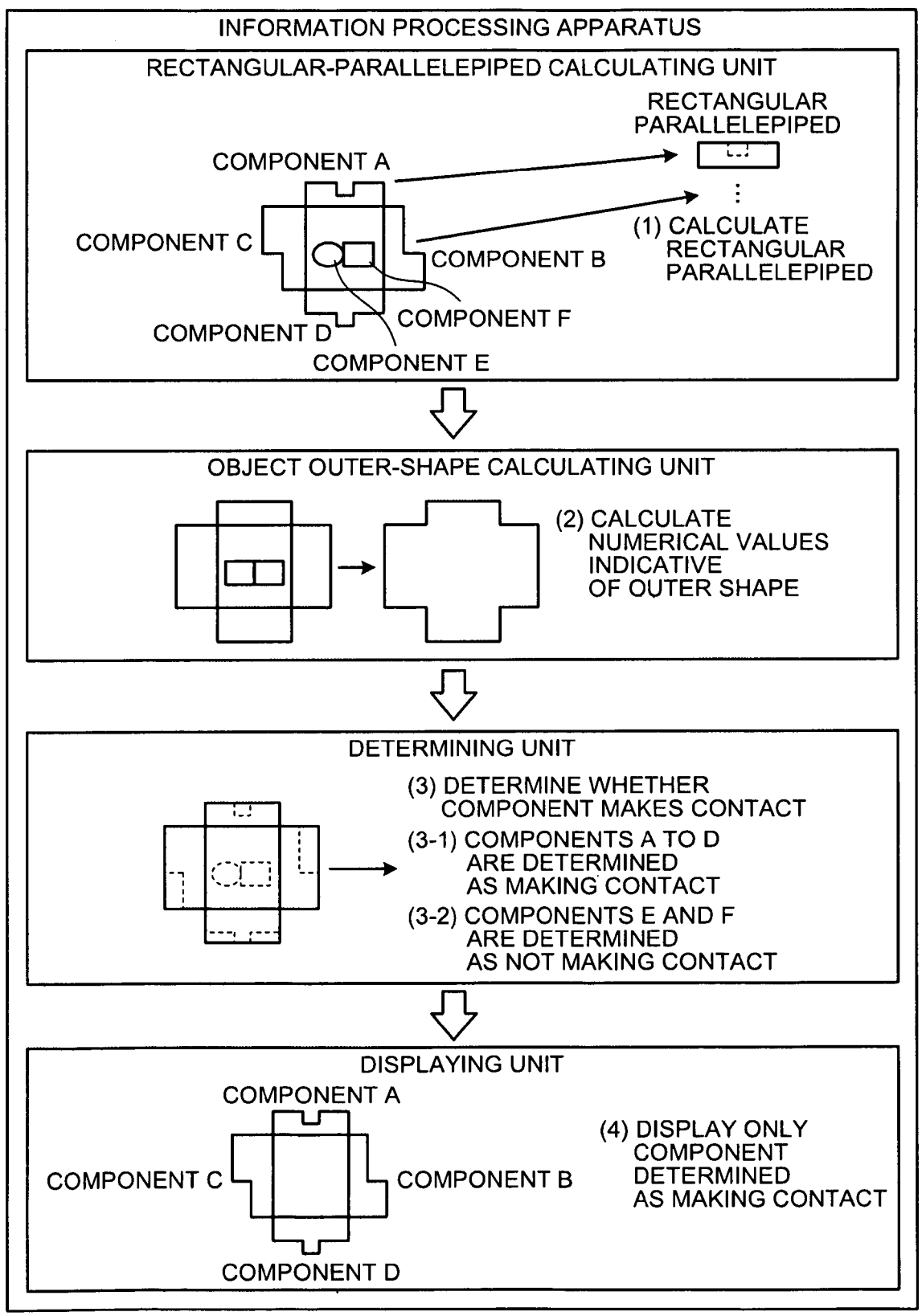
FIG. 1 is a drawing for explaining a general outline of an information processing apparatus according to a first embodiment.

First, the general outline of the information processing apparatus according to the first embodiment is explained by using FIG. 1. FIG. 1 is a drawing for explaining the general outline of the information processing apparatus according to the first embodiment.

As depicted in (1) of FIG. 1, in the information processing apparatus according to the first embodiment, a rectangular-parallelepiped calculating unit calculates, for each component forming an object, a minimum rectangular parallelepiped including the component by using numerical values indicative of the shape of the component. For example, when the object is configured of "component A" to "component F", the rectangular-parallelepiped calculating unit calculates a rectangular parallelepiped for each component. For convenience of explanation, while each component has a shape in a three-dimensional space, the component is explained as a figure in a two-dimensional surface.

Then, as depicted in (2) of FIG. 1, in the information processing apparatus according to the first embodiment, the outer-shape calculating unit replaces every component configuring the object by the rectangular parallelepiped calculated by the calculating unit, and calculates numerical values indicative of the outer shape of an object formed by collecting every replaced component into one.

Then, as depicted in (3) of FIG. 1, in the information processing apparatus according to the first embodiment, a determining unit determines for each component whether the component makes contact with the outer shape by using the numerical values indicative of the outer shape calculated by the outer-shape calculating unit and the numerical values indicative of the shape of the component. For example, the determining unit determines for each of "component A" to "component F" whether the component makes contact. The determining unit then determines "component A" to "component D" as making contact as depicted in (3-1) of FIG. 1, whilst determining "component E" and "component F" as not making contact as depicted in (3-2) of FIG. 1.

Then, as depicted in (4) of FIG. 1, in the information processing apparatus according to the first embodiment, a displaying unit causes an object configured of only the component determined by the determining unit as making contact to be displayed on the displaying unit. For example, the displaying unit causes an object configured of only "component A" to "component D" to be displayed on the displaying unit.

From the above, the information processing apparatus according to the first embodiment can cause the object to be displayed with components unnecessary for displaying the outer shape deleted therefrom, thereby displaying only the outer shape (exterior).

[Configuration of the Information Processing Apparatus]

Figure 2:
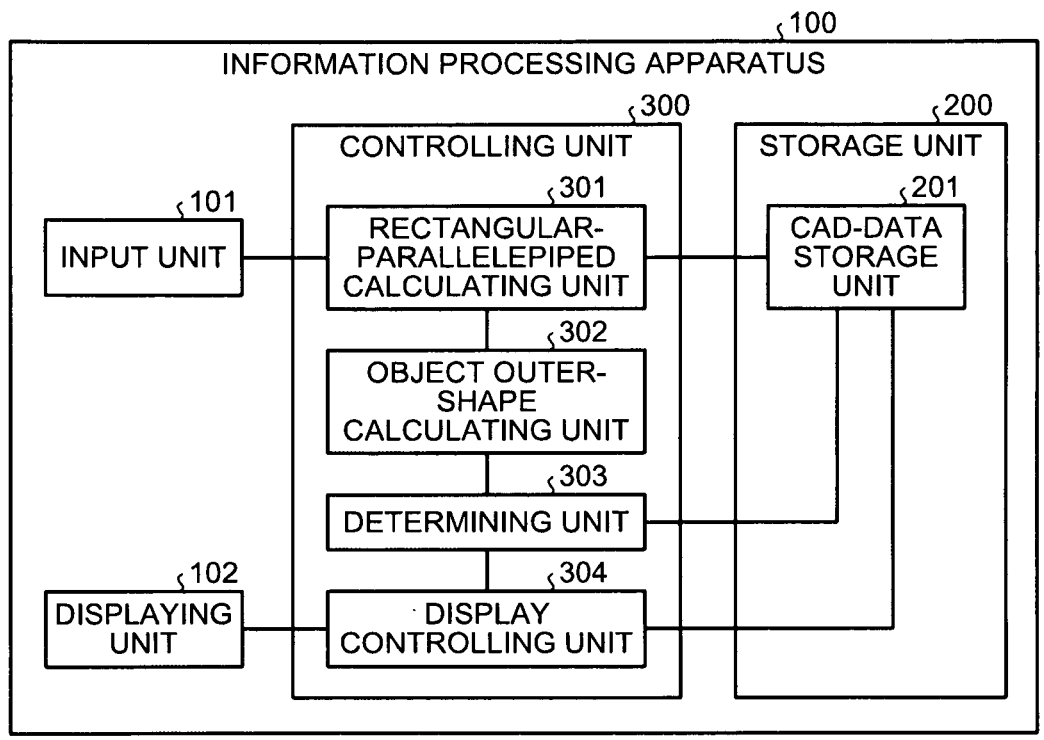
FIG. 2 is a block diagram for explaining the configuration of the information processing apparatus according to the first embodiment.

Next, the configuration of the information processing apparatus depicted in FIG. 1 is explained by using FIG. 2. FIG. 2 is a block diagram for explaining the configuration of the information processing apparatus according to the first embodiment. As depicted in the drawing, an information processing apparatus 100 includes an input unit 101, a display unit 102, a storage unit 200, and a control unit 300.

Figure 3:
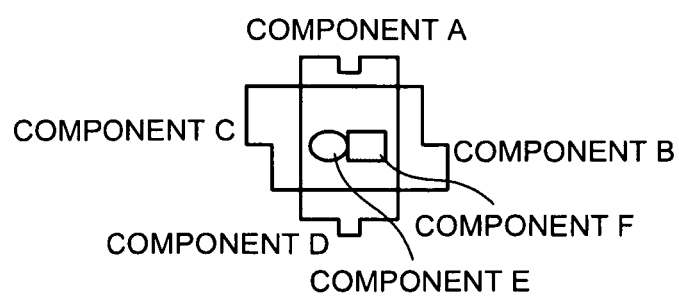
FIG. 3 is a drawing for explaining an example of an object in the first embodiment.

In the following, when explanation is made with a specific example, an object depicted in FIG. 3 is used unless otherwise specified, and components configuring the object are assumed to be "component A" to "component F". For convenience of explanation, while each component has a shape in a three-dimensional space, the component is explained as a figure in a two-dimensional surface. FIG. 3 is a drawing for explaining an example of the object in the first embodiment.

Here, the information processing apparatus 100 corresponds to a CAD machine, a simulation apparatus, or an analyzer that analyzes the shape of an object, for example, and is used, for example, when only the outer shape of the object is displayed.

An example of the case when only the outer shape of the object is displayed is briefly explained. Conventionally, for example, in manufacturing design for robots and automobiles, the number of components amounts to several thousands to several tens of thousands. While the analyzer requires these components in an analysis, such as an interference check, the analyzer requires the outer shape in animation and manual creation. In a specific example, when the operation of a robot is displayed with animation, the analyzer does not require components inside the robot. As such, the information processing apparatus 100 is used when only the outer shape is required.

The input unit 101 is connected to a rectangular-parallelepiped calculating unit 301, which will be explained further below, accepting an input of various information from a user. Specifically, the input unit 101 includes a keyboard, a mouse, and a microphone to accept from the user an instruction for displaying the outer shape and sends the instruction to the rectangular-parallelepiped calculating unit 301.

The display unit 102 is connected to a display control unit 304, which will be explained further below, displaying various information. Specifically, the display unit 102 corresponds to a monitor, and is controlled by the display control unit 304 to display the shape of the object.

The storage unit 200 is connected to the control unit 300, stores data required for various processes by the control unit 300, and includes the CAD-data storage unit 201. The CAD-data storage unit 201 is connected to the rectangular-parallelepiped calculating unit 301, a determining unit 303, and the display control unit 304, which will be explained further below.

As depicted in FIG. 4, the CAD-data storage unit 201 stores various numerical values indicative of the shape of each component and, for example, stores "CAD data" representing numerical values indicative of the shape of the components each in association with a "component ID" identifying the component configuring the object. FIG. 4 is a drawing for explaining the CAD-data storage unit in the first embodiment. This CAD data corresponds to, for example, coordinate information in a three-dimensional space.

In an example depicted in FIG. 4, the CAD-data storage unit 201 stores CAD data "CAD data A" in association with a component ID "component A", and stores CAD data for each of "component B" to "component F" in a similar manner.

Also, as depicted in FIG. 4, the CAD-data storage unit 201 stores "non-contact component" information indicating that the component is determined by the determining unit 303 as not making contact. A determination process by the determining unit 303 will be explained further below, and therefore are not explained herein. Specifically, the CAD-data storage unit 201 stores a circle indicative of a non-contact component for a component determined by the determining unit 303 as not making contact. In the example depicted in FIG. 4, the CAD-data storage unit 201 stores a circle indicative of a non-contact component in association with each of "component E" and "component F".

Also, among the information stored in the CAD-data storage unit 201, each piece of CAD data associated with a component ID is input in advance by the user, and is used by the rectangular-parallelepiped calculating unit 301. Also, among the information stored in the CAD-data storage unit 201, "non-contact component" information associated with a component ID is input by the determining unit 303, and is used by the display control unit 304.

The control unit 300 is connected to the input unit 101, the display unit 102, and the storage unit 200, has an internal memory for storing programs defining various shape display processes procedure, and performs these various shape display processes. Also, the control unit 300 includes the rectangular-parallelepiped calculating unit 301, an object outer-shape calculating unit 302, the determining unit 303, and the display control unit 304.

The rectangular-parallelepiped calculating unit 301 is connected to the input unit 101 the CAD-data storage unit 201, and the object outer-shape calculating unit 302. Also, as depicted in FIG. 5, when receiving from the input unit 101 an instruction for displaying the outer shape, the rectangular-parallelepiped calculating unit 301 calculates, for each component configuring the object, a minimum rectangular parallelepiped including the component by using numerical values indicative of the shape of the component. FIG. 5 is a drawing for explaining the rectangular-parallelepiped calculating unit in the first embodiment. For example, the rectangular-parallelepiped calculating unit 301 calculates, for each of "component A" to "component F", a minimum rectangular parallelepiped including the component.

For example, when calculating a minimum rectangular parallelepiped for "component A", the rectangular-parallelepiped calculating unit 301 obtains from the CAD-data storage unit 201 "CAD data A", which is CAD data associated with "component A". The rectangular-parallelepiped calculating unit 301 then uses "CAD data A" to calculate CAD data representing a minimum rectangular parallelepiped including "component A".

Also, the rectangular-parallelepiped calculating unit 301 sends each of the calculated numerical values indicative of rectangular parallelepipeds to the object outer-shape calculating unit 302. For example, the rectangular-parallelepiped calculating unit 301 sends CAD data representing rectangular parallelepipeds calculated for "component A" to "component F".

Figure 6A:
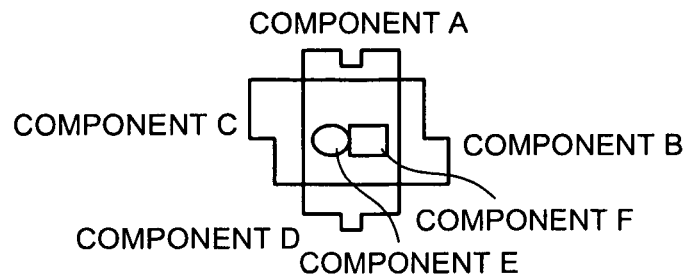
FIGS. 6A to 6C are drawings for explaining an object outer-shape calculating unit in the first embodiment.
Figure 6B:
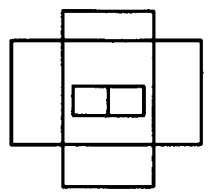
Figure 6C:
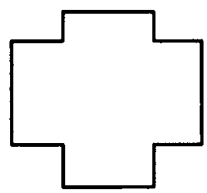

The object outer-shape calculating unit 302 is connected to the rectangular-parallelepiped calculating unit 301 and the determining unit 303, receiving numerical values indicative of the rectangular parallelepipeds calculated by the rectangular-parallelepiped calculating unit 301 for each component. Then, as depicted in FIGS. 6A to 6C, the object outer-shape calculating unit 302 replaces all components configuring the object by the rectangular parallelepipeds calculated by the rectangular-parallelepiped calculating unit 301, and calculates numerical values indicative of the outer shape of the object formed by collecting the replaced components into one. FIGS. 6A to 6C are drawings for explaining the object outer-shape calculating unit in the first embodiment.

For example, the object outer-shape calculating unit 302 receives CAD data representing the rectangular parallelepipeds calculated for "component A" to "component F". Then, for the shape of an object depicted in FIG. 6A, the object outer-shape calculating unit 302 then replaces the shapes of "component A" to "component F" by the rectangular parallelepipeds calculated by the rectangular-parallelepiped calculating unit 301, as depicted in FIG. 6B.

Also, for example, the object outer-shape calculating unit 302 performs a set operation for the object with each shape of the component replaced by the rectangular parallelepiped depicted in FIG. 6B. Then, as depicted in FIG. 6C, the object outer-shape calculating unit 302 calculates numerical values indicative of the outer shape of the object formed by collecting "component A" to "component F" included in the object into one. That is, for example, for an object formed by performing a set operation with the CAD data representing the rectangular parallelepipeds calculated for "component A" to "component F", the object outer-shape calculating unit 302 calculates CAD data representing the outer shape.

Also, the object outer-shape calculating unit 302 sends the numerical values indicative of the outer shape of the object formed by collecting the components replaced by the rectangular parallelepipeds to the determining unit 303. For example, the object outer-shape calculating unit 302 sends CAD data representing the outer shape.

Figure 7A:
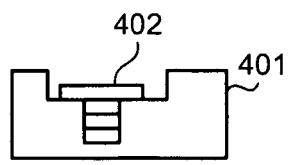
FIGS. 7A to 7C are drawings for explaining an outer shape calculated by the object outer-shape calculating unit in the first embodiment.
Figure 7B:
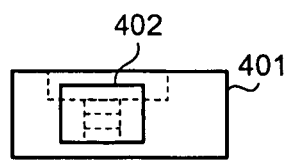
Figure 7C:

Here, the outer shape calculated by the object outer-shape calculating unit 302 is further explained by using FIGS. 7A to 7C. Explanation is made by using the case as depicted in FIG. 7A where, in an object configured of a component 401 and a screw 402, the outer side of the component 401 is partially dented to form a screw hole and the screw 402 is positioned in the screw hole. FIGS. 7A to 7C are drawings for explaining an outer shape calculated by the object outer-shape calculating unit in the first embodiment.

As depicted in FIG. 7A, the screw 402 is positioned in the screw hole formed by partially denting the outside of the component 401. Here, when the shape of the component 401 and the screw 402 are replaced by rectangular parallelepipeds, as depicted in FIG. 7B, the rectangular parallelepiped for the screw 402 is positioned inside of the rectangular parallelepiped for the component 401. Since the object outer-shape calculating unit 302 calculates the outer shape for an object obtained by performing a set operation with rectangular parallelepipeds for the respective components, as depicted in FIG. 7C, the object outer-shape calculating unit 302 calculates numerical values indicative of the outer shape of the rectangular parallelepiped for the component 401 irrespectively of the rectangular parallelepiped for the screw 402.

The determining unit 303 is connected to the CAD-data storage unit 201, the object outer-shape calculating unit 302, and the display control unit 304, and receives from the object outer-shape calculating unit 302 numerical values indicative of the outer shape of the object formed by collecting the components replaced by the rectangular parallelepipeds into one. For example, the determining unit 303 receives CAD data representing the outer shape. Also, the determining unit 303 obtains numerical values indicative of the shape of each component from the CAD-data storage unit 201. For example, the determining unit 303 obtains CAD data for each of "component A" to "component F".

Figure 8:
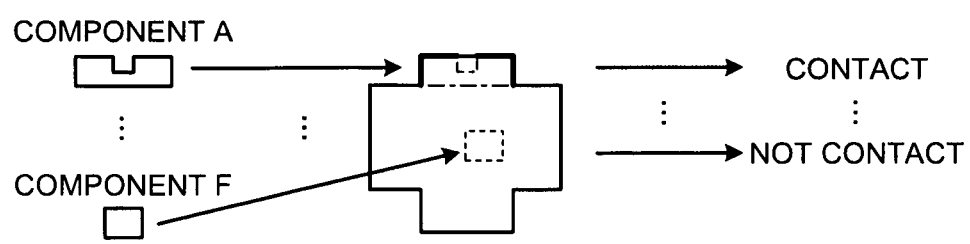
FIG. 8 is a drawing for explaining a determining unit in the first embodiment.

Also, as depicted in FIG. 8, the determining unit 303 uses the numerical values indicative of the outer shape calculated by the object outer-shape calculating unit 302 and the numerical values indicative of the shape of each component obtained from the CAD-data storage unit 201 to determine for each component whether the component makes contact with the outer shape. When even one side of the shape of the component makes contact, the determining unit 303 determines that the component makes contact. FIG. 8 is a drawing for explaining the determining unit in the first embodiment.

In the example depicted in FIG. 8, the determining unit 303 determines for each of "component A" to "component F" whether the component replaced by the rectangular parallelepiped makes contact with the outer shape of the object. For example, as depicted in a bold line in FIG. 8, since "component A" makes contact with the outer shape of the object formed by collecting the components replaced by the rectangular parallelepipeds, the determining unit 303 determines that the component makes contact. Also, since "component F" does not make contact with the outer shape of the object formed by collecting the components replaced by the rectangular parallelepipeds, the determining unit 303 determines that the component does not make contact. The bold line in FIG. 8 represents a portion where the outer shape of the object formed by collecting the components replaced by the rectangular parallelepipeds and the shape of any component make contact with each other.

For example, the determining unit 303 selects one component, that is, selects one of "component A" to "component F", and then selects one side of the selected component. The determining unit 303 then determines whether the normal vector of the outer shape of the object formed by collecting the components replaced by the rectangular parallelepipeds into one and the normal vector of the side of the component match each other. When determining that the normal vectors match each other, the determining unit 303 determines whether they interfere with each other. When determining that the normal vectors match each other and then determining that they interfere with each other, the determining unit 303 determines that the component makes contact. On the other hand, when determining that the normal vectors do not match each other or when determining that the normal vector match each other and then determining that they do not interfere with each other, the determining unit 303 determines that the component does not make contact.

Here, the side corresponds to any one of six sides configuring a rectangular parallelepiped, for example. Also, the normal vector indicates a vector orthogonal to a side. Furthermore, a determination as to whether the normal vectors interfere with each other is made so as to distinguish between the case where the outer shape of the object formed by collecting the components replaced by the rectangular parallelepipeds into one and the side of the component are positioned in parallel to each other and the case where the outer shape of the object and the side of the component match each other, even when the normal vectors match each other. That is, when the outer shape of the object formed by collecting the components replaced by the rectangular parallelepipeds into one and the side of the component interfere with each other, the outer shape and the side make contact with each other, and therefore they are unlikely positioned in parallel to each other but their positions match each other. Thus, the determining unit 303 determines that they make contact.

When determining that the component does not make contact, for example, the determining unit 303 determines whether the determination process has been performed for all sides of the component. When determining that the determination process has not been performed for all sides, the determining unit 303 selects unselected one of the sides of the component to repeat the determination process.

When determining that the determination process has been performed for all sides of the component or that the component makes contact, for example, the determining unit 303 determines whether the determination process has been performed for all components. When not determining that the determination process has been made for all components, the determining unit 303 selects unselected one of the components to repeat the determination process. When determining that the determination process has been performed for all components, the determining unit 303 ends the process.

Also, for example, for a component determined as making contact, the determining unit 303 inputs in the CAD-data storage unit 201 a circle indicative of a non-contact component in association with a component ID identifying the component. For example, the determining unit 303 inputs a circle indicative of a non-contact component in association with "component E" and "component F" determined as not making contact.

Also, the determining unit 303 sends to the display control unit 304 information indicating that the determination process has ended.

Figure 9A:
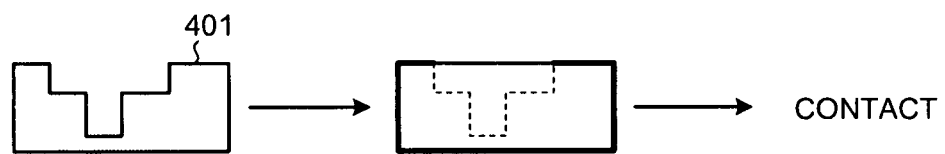
FIGS. 9A and 9B are drawings for explaining a determination in the determining unit in the first embodiment.
Figure 9B:
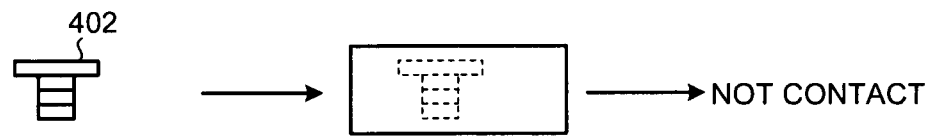

A determination by the determining unit 303 as to whether the component makes contact is further explained by using FIGS. 9A and 9B. FIGS. 9A and 9B are drawings for explaining a determination in the determining unit in the first embodiment. In FIGS. 9A and 9B, the example with the component 401 and the screw 402 explained with reference to FIGS. 7A to 7C is used.

As depicted in FIG. 9A, since the outer shape of the object formed by collecting the components replaced by the rectangular parallelepipeds into one and the component 401 make contact with each other, the determining unit 303 determines that they make contact with each other. On the other hand, as depicted in FIG. 9B, since the outer shape of the object formed by collecting the components replaced by the rectangular parallelepipeds into one and the screw 402 do not make contact with each other, the determining unit 303 determines that they do not make contact with each other. That is, among the components configuring the object, for a component, such as a screw, positioned in a dented portion of the outer shape, the determining unit 303 determines that the component does not make contact even though it can be viewed from outside. A bold line in FIGS. 9A and 9B represents a portion where the outer shape of the object formed by collecting the components replaced by the rectangular parallelepipeds and the shape of any component make contact with each other.

Figure 10A:
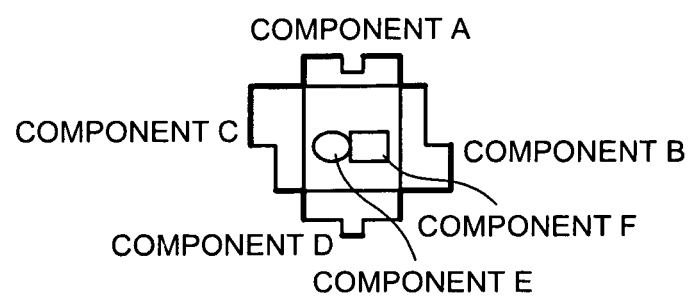
FIGS. 10A and 10B drawings for explaining a display controlling unit in the first embodiment.
Figure 10B:
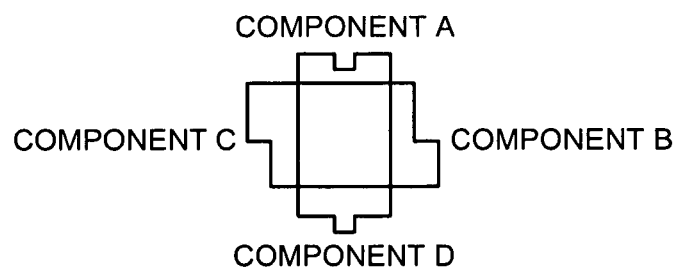

The display control unit 304 is connected to the display unit 102, the CAD-data storage unit 201, and the determining unit 303, receives from the determining unit 303 information indicating that the determination process has ended, and controls the display unit 102 so that the outer shape of the object configured of only the components determined as making contact is displayed, as depicted in FIGS. 10A and 10B.

Specifically, upon receiving from the determining unit 303 information indicating that the determination process has ended, the display control unit 304 obtains from the CAD-data storage unit 201 CAD data for each component ID associated with a circle indicative of non-contact component. The display control unit 304 then uses the obtained CAD data to control the display unit 102 so that the object is displayed.

For example, as depicted in FIG. 10A, the display control unit 304 uses "component A" to "component D" determined as making contact for control so that an object configured of "component A" to "component D" is displayed, as depicted in FIG. 10B. That is, the display control unit 304 performs control so that an object configured of the components except "component E" and "component F" determined as not making contact is displayed on the display unit 102. A bold line in FIGS. 10A and 10B represents a portion where the outer shape of the object formed by collecting the components replaced by the rectangular parallelepipeds and the shape of any component make contact with each other.

[Process by the Information Processing Apparatus]

Figure 11:
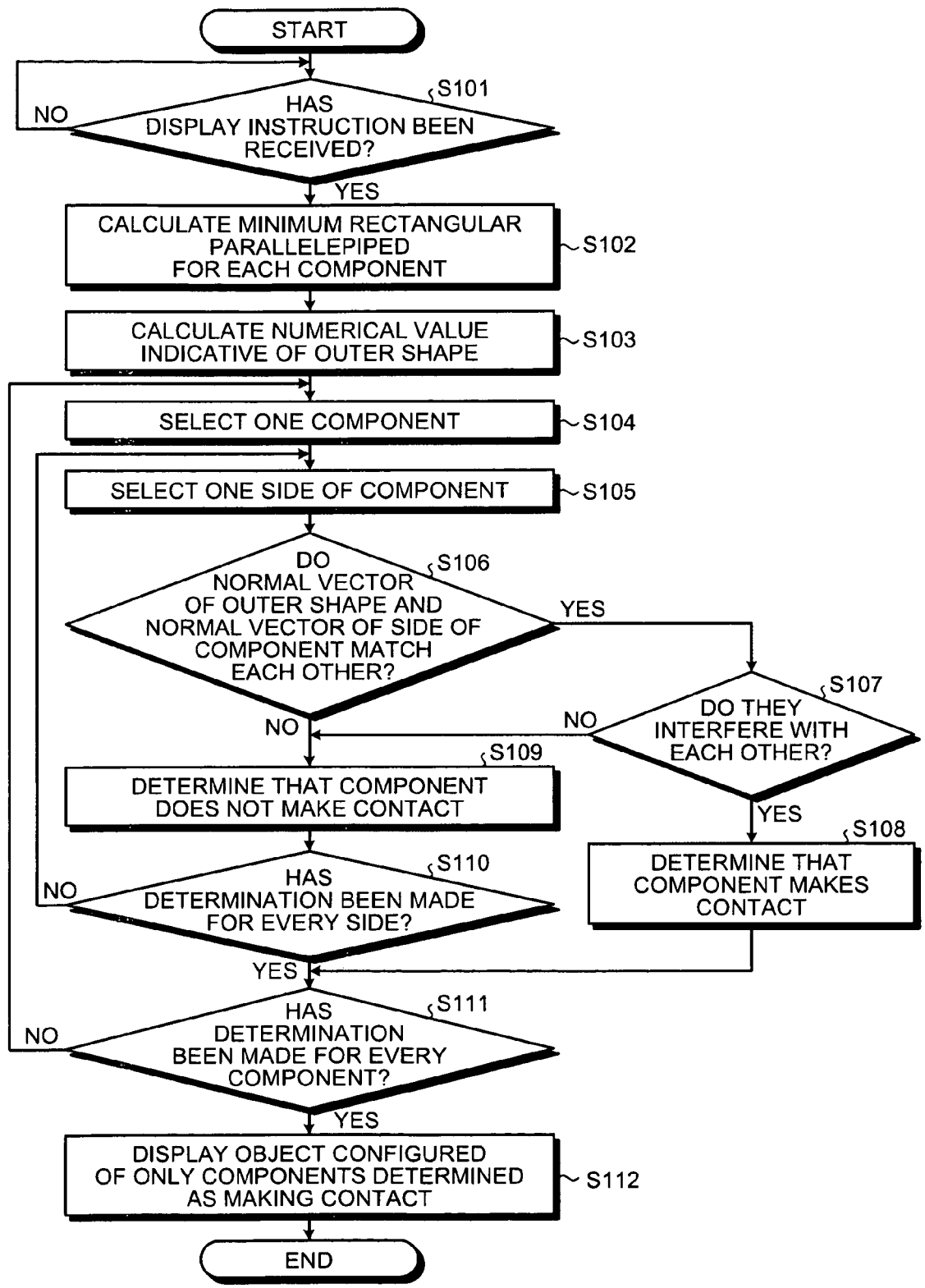
FIG. 11 is a flowchart for explaining a process flow of the information processing apparatus in the first embodiment.

Next, the process by the information processing apparatus 100 is explained by using FIG. 11. FIG. 11 is a flowchart for explaining a process flow of the information processing apparatus in the first embodiment.

As depicted in the drawing, in the information processing apparatus 100, upon receiving a display instruction (Yes at Step S101), for example, when an instruction for displaying the outer shape is input from a user, the rectangular-parallelepiped calculating unit 301 calculates, for each component, a minimum rectangular parallelepiped including the component (Step S102). For example, for each of "component A" to "component F", the rectangular-parallelepiped calculating unit 301 calculates a minimum rectangular parallelepiped including the component.

The object outer-shape calculating unit 302 then replaces every component configuring the object by the rectangular parallelepiped, and calculates numerical values indicative of the outer shape of an object formed by collecting the replaced components into one (Step S103). For example, the object outer-shape calculating unit 302 calculates the outer shape of an object formed by collecting "component A" to "component F" replaced by the rectangular parallelepipeds into one.

The determining unit 303 then selects one component (Step S104). For example, the determining unit 303 selects one of "component A" to "component F". The determining unit 303 then selects one of the sides of the selected component (Step S105). The determining unit 303 then determines whether the normal vector of the outer shape of the object formed by collecting the components replaced by the rectangular parallelepipeds and the normal vector of the side of the component match each other (Step S106). When the normal vectors match each other (Yes at Step S106), the determining unit 303 determines whether they interfere with each other (Step S107).

When determining that the normal vectors match each other (Yes at Step S106) and then determining that they interfere with each other (Yes at Step S107), the determining unit 303 determines that the component makes contact (Step S108). On the other hand, when determining that the normal vectors do not match each other (No at Step S106) or when determining that the normal vectors match each other and then determining that they do not interfere with each other (Yes at Step S106 and No at Step S107), the determining unit 303 determines that the component does not make contact (Step S109).

When determining the component as not making contact (Step S109), the determining unit 303 determines whether the determination process has been made for every side of the component (Step S110). When determining that the determination process has not been made for every side (No at Step S110), the determining unit 303 returns to Step S105 to repeat the process. On the other hand, when determining that the determination has been made for every side (Yes at Step S110) or when determining that the component makes contact (Step S108), the determining unit 303 determines whether the determination process has been made for every component (Step S111). When not determining that the determination process has been made for every component (No at Step S111), the determining unit 303 returns to Step S104 to repeat the process. On the other hand, when the determining unit 303 determines that the determination process has been made for every component (Yes at step S111), the display control unit 304 controls the display unit 102 so that an object configured of only the components determined as making contact is displayed (Step S112). That is, the display control unit 304 causes the object configured of only the components excluding "component E" and "component F" determined as not making contact to be displayed.

[Effects of the First Embodiment]

As explained above, according to the first embodiment, for each component configuring an object, a minimum rectangular parallelepiped including the component is calculated by using numerical values indicative of the shape of the component, all components configuring the object are replaced by the rectangular parallelepipeds, and numerical values indicative of the outer shape of an object formed by collecting the components replaced by the rectangular parallelepipeds into one are calculated. Also, by using the numerical values indicative of the outer shape and the numerical values indicative of the shape of the components, it is determined for each component whether the component makes contact with the outer shape, and the outer shape of the object configured of only the components determined as making contact is displayed on the displaying unit. Therefore, only the outer shape can be displayed.

Also, the information processing apparatus 100 causes the object to be displayed with deletion of not only a component that cannot be viewed from outside but also a component positioned in a dented portion not necessary for displaying the outer shape even though it can be viewed from outside. An example of an unnecessary component is a small joining component, such as a screw.

Furthermore, according to the first embodiment, the outer shape of the object is displayed by using only the numerical values indicative of the shape of the object. Therefore, the outer shape can be displayed without using a feature, for example, and independently of CAD apparatuses or programs. A feature is an operation procedure defined in advance for a specific shape or a model created by using the procedure.

That is, for example, types of executable operation may differ in different CAD systems. Even if a feature is sent to a different CAD system, the feature is not necessarily executed on the CAD system receiving that feature. On the other hand, according to the first embodiment, no feature is used, and only the numerical values indicative of the shape of the object are used. Therefore, the outer shape can be displayed irrespectively of the type of the CAD system.

Still further, according to the first embodiment, the outer shape can be displayed without separately creating an assembly. The assembly represents data formed by combining a plurality of components (parts) separately created. That is, according to the first embodiment, the outer shape can be displayed without separately selecting components necessary for displaying the outer shape to generate data for outer-shape display formed by collecting pieces of data about the selected components in advance.

Still further, according to the first embodiment, the component is determined as making contact when even one side of the shape of the component makes contact. Therefore, when even one side makes contact, it can be determined that the component makes contact without performing a determination process for other sides, thereby quickly performing the process.

[Second Embodiment]
[CAD-Data Storage Unit]

For example, in the first embodiment, the technique has been explained in which the information processing apparatus 100 includes the CAD-data storage unit 201 and the CAD data stored in advance in the CAD-data storage unit 201 is used. However, the present invention is not restricted to this. For example, the information processing apparatus 100 may not include the CAD-data storage unit 201 and may perform a process with an input of CAD data from a user when appropriate.

[Combination of Embodiments]

Also, in the first embodiment, in the determination process by the determining unit 303, the technique has been explained in which the component is determined as making contact when even one side of the shape of the component makes contact. However, the present invention is not restricted to this. A determination process may be made for every side.

Furthermore, when determining whether each component makes contact, the determining unit 303 may calculate an area making contact with the outer shape of the object formed by collecting the components replaced by the rectangular parallelepipeds, and may determine that the component does not make contact only when the area is smaller than an area set in advance. That is, for example, even if a component is positioned in a dented portion, when the component is large and it is better to display the shape, that component can be displayed.

[System Configuration]

The process procedure, the control procedure, specific names, and information including various data and parameters in the specification and drawings (for example, see FIGS. 1 to 11) can be arbitrarily changed unless otherwise specified.

Also, each component depicted is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use.

For example, explanation is now made by using the example depicted in FIG. 2. The display unit 102 may be formed as another apparatus, the information processing apparatus 100 may transmit information about component used for displaying the outer shape of the object to the display unit 102 as another apparatus, and the display unit 102 may use the received information to display the outer shape of the object. For example, the information processing apparatus 100 may transmit a component ID identifying the component and CAD data for the component as information about each component.

[Program]

Figure 12:
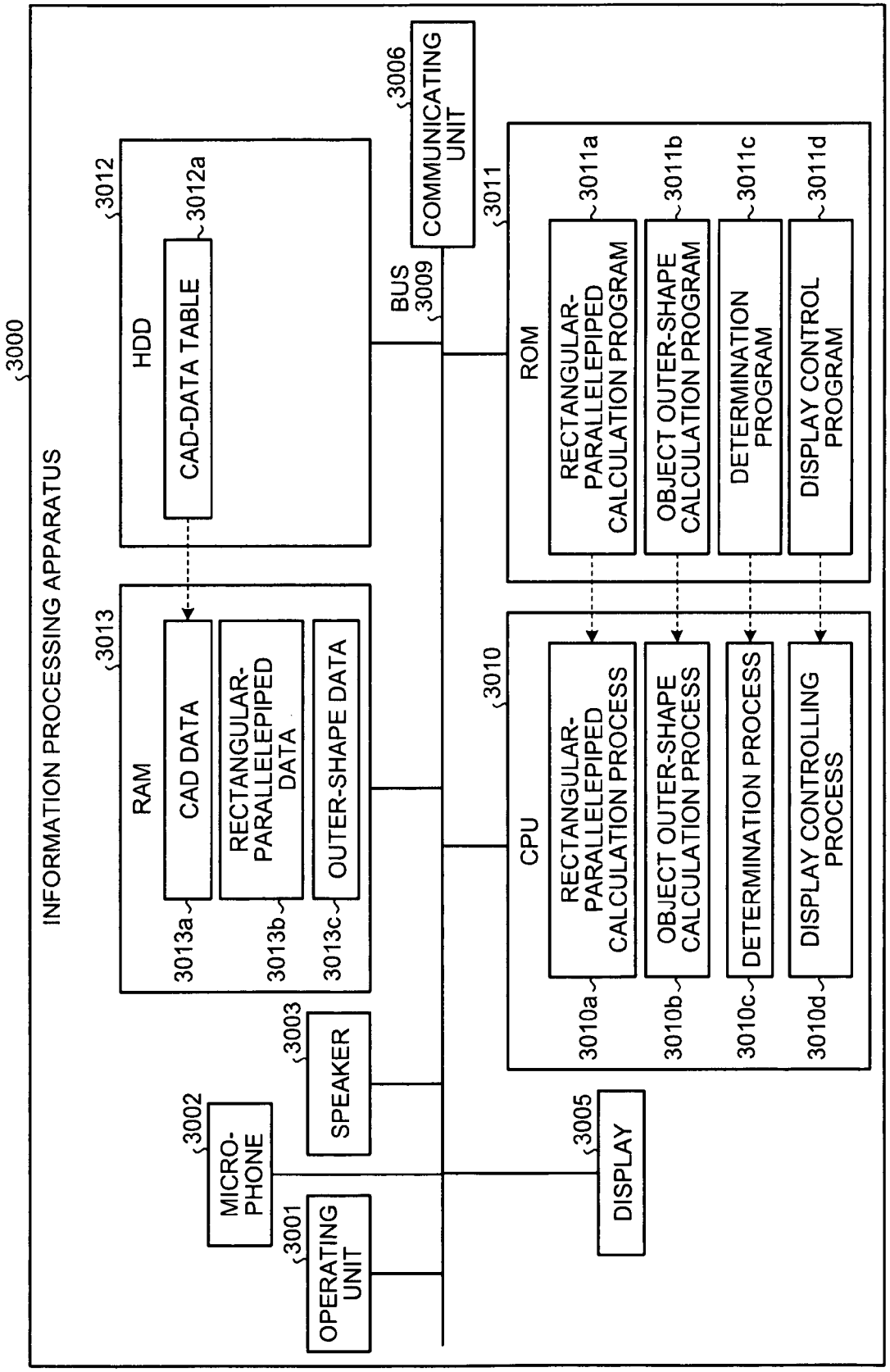
FIG. 12 is a drawing for explaining programs of the information processing apparatuses according to the first embodiment.

Also, the various processes explained in the embodiment can be achieved by executing a program prepared in advance on a computer, such as a personal computer or work station. In the following, an example of a computer executing programs with functions similar to those in the embodiment is explained by using FIG. 12. FIG. 12 is a drawing for explaining programs of the information processing apparatuses according to the first embodiment.

A depicted in the drawing, an information processing apparatus 3000 in the first embodiment is configured to include an operating unit 3001, a microphone 3002, a loudspeaker 3003, a display 3005, a communicating unit 3006, a Central Processing Unit (CPU) 3010, a Read-Only Memory (ROM) 3011, a Hard Disk Drive (HDD) 3012, and a Random Access Memory (RAM) 3013, which are connected by, for example, a bus 3009.

The ROM 3011 has control programs stored therein in advance, the control programs achieving functions similar to the those of the rectangular-parallelepiped calculating unit 301, the object outer-shape calculating unit 302, the determining unit 303, and the display control unit 304 depicted in the first embodiment, that is, as depicted in FIG. 12, a rectangular-parallelepiped calculation program 3011a, an object outer-shape calculation program 3011b, a determination program 3011c, and a display control program 3011d. These programs 3011a to 3011d may be unified or separated in a manner similar to each component of the information processing apparatus depicted in FIG. 2.

With the CPU 3010 reading these programs 3011a to 3011d from the ROM 3011 for execution, as depicted in FIG. 12, the programs 3011a to 3011d function as a rectangular-parallelepiped calculation process 3010a, an object outer-shape calculation process 3010b, a determination process 3010c, and a display control process 3010d. These processes 3010a to 3010d correspond to the rectangular-parallelepiped calculating unit 301, the object outer-shape calculating unit 302, the determining unit 303, and the display control unit 304 as depicted in FIG. 12, respectively.

The HDD 3012 is provided with a CAD-data table 3012a. The CAD-data table 3012a corresponds to the CAD-data storage unit 201 depicted in FIG. 2.

The CPU 3010 reads data from the CAD-data table 3012a, stores the data in the RAM 3013 as CAD data 3013a, and executes programs by using rectangular-parallelepiped data 3013b and outer-shape data 3013c. The outer-shape data 3013c corresponds to numerical values indicative of the outer shape of the object formed by collecting the components replaced by the rectangular parallelepipeds into one.

[Others]

The information processing apparatus explained in the embodiment can be achieved by executing a program prepared in advance on a computer, such as a personal computer or work station. This program can be distributed over a network, such as the Internet. Furthermore, this program can be recorded on a computer-readable recording medium, such as a hard disk, flexible disk (FD), compact-disk read only memory (CD-ROM), magneto-optical disk (MO), and digital versatile disk (DVD), and can be also read by the computer from the recording medium for execution.

According to the embodiments, only the outer shape can be displayed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus that displays a shape of an object on a display device by using numerical values on a coordinate axis, the apparatus comprising:
   a memory; and
   a processor coupled to the memory, wherein the processor executes a process comprising:
   calculating for each component constituting the object, a rectangular parallelepiped by using numerical values indicative of a shape of the component, each calculated rectangular parallelpiped being a minimum rectangular parallelpiped including corresponding component entirely, respectively;
   replacing each component constituting the object with each rectangular parallelepiped calculated and calculating numerical values indicative of an outer shape of an object formed by collecting every replaced rectangular parallelpiped into one;
   determining for each component whether the component makes contact with the outer shape based on the numerical values indicative of the outer shape and the numerical values indicative of the shape of the component, by determining whether a normal vector of the outer shape and a normal vector of a side of the component match each other and whether the outer shape and the side of the component interfere with each other; and
   displaying on the display device an object composed of only components determined as making contact by the determining unit,
   wherein the determining includes determining for each component whether the component makes contact with the outer shape based on the numerical values indicative of the outer shape and the numerical values indicative of the shape of the component, by:
   selecting a side of the component,
   determining whether a normal vector of the outer shape and a normal vector of the selected side of the component match each other and whether the outer shape and the selected side of the component interfere with each other,
   wherein when it is determined that the normal vectors match each other and the outer shape and the selected side of the component interfere with each other, determining that the component makes contact, when it is determined that the normal vectors do not match each other or the outer shape and the selected side of the component do not interfere with each other, determining whether all sides of the component are selected, when it is determined that all sides of the component are selected, determining that the component does not make contact, and when it is determined that all sides of the component are not selected, selecting one of the other sides which is not selected.

2. The information processing apparatus according to claim 1, wherein the determining includes determining the component as making contact when even one side of the shape of the component makes contact.

3. The information processing apparatus according to claim 1, wherein the determining includes determining based on the numerical values indicative of the outer shape and the numerical values indicative of the shape of the component, by determining whether a normal vector of the outer shape and a normal vector of a side of the component match each other and determining whether the outer shape and the side of the component interfere with each other when the normal vector of the outer shape and the normal vector of the side of the component match each other.

4. A method of processing information that displays a shape of an object on a display device by using numerical values on a coordinate axis, the method comprising:

calculating, for each component constituting the object, a rectangular parallelepiped by using numerical values indicative of a shape of the component, each calculated rectangular parallelpiped being a minimum rectangular parallelpiped including corresponding component entirely, respectively;

replacing each component constituting the object by the rectangular parallelepiped calculated with each calculating a minimum rectangular parallelepiped, and calculating numerical values indicative of an outer shape of an object formed by collecting every replaced rectangular parallelpiped into one;

determining for each component whether the component makes contact with the outer shape based on the numerical values indicative of the outer shape and the numerical values indicative of the shape of the component, by determining whether a normal vector of the outer shape and a normal vector of a side of the component match each other and whether the outer shape and the side of the component interfere with each other; and displaying on the display device an outer shape of an object composed of only components determined as making contact by the determining, wherein the determining includes determining for each component whether the component makes contact with the outer shape based on the numerical values indicative of the outer shape and the numerical values indicative of the shape of the component, by:

selecting a side of the component, determining whether a normal vector of the outer shape and a normal vector of the selected side of the component match each other and whether the outer shape and the selected side of the component interfere with each other, wherein when the firstly determining determines the normal vectors match each other and the outer shape and the selected side of the component interfere with each other, determining that the component makes contact, when it is determined that the normal vectors do not match each other or the outer shape and the selected side of the component do not interfere with each other, determining whether all sides of the component are selected, when it is determined that all sides of the component are selected, determining that the component does not make contact, and when it is determined that all sides of the component are not selected, selecting one of the other sides which is not selected.

5. A non-transitory computer-readable recording medium that stores therein an information processing program that causes a computer to display a shape of an object on a display device by using numerical values on a coordinate axis, the program causing the computer to execute:

calculating, for each component constituting the object, a rectangular parallelepiped by using numerical values indicative of a shape of the component, each calculated rectangular parallelpiped being a minimum rectangular parallelpiped including corresponding component entirely, respectively;

replacing each component constituting the object by the rectangular parallelepiped calculated with each calculating a minimum rectangular parallelepiped, and calculating numerical values indicative of an outer shape of an object formed by collecting every replaced rectangular parallelpiped into one;

determining for each component whether the component makes contact with the outer shape based on the numerical values indicative of the outer shape and the numerical values indicative of the shape of the component, by determining whether a normal vector of the outer shape and a normal vector of a side of the component match each other and whether the outer shape and the side of the component interfere with each other; and displaying on the display device an outer shape of an object composed of only components determined as making contact by the determining, wherein the determining includes determining for each component whether the component makes contact with the outer shape based on the numerical values indicative of the outer shape and the numerical values indicative of the shape of the component, by:

selecting a side of the component, determining whether a normal vector of the outer shape and a normal vector of the selected side of the component match each other and whether the outer shape and the selected side of the component interfere with each other, wherein when it is determined that the normal vectors match each other and the outer shape and the selected side of the component interfere with each other, determining that the component makes contact, when it is determined that the normal vectors do not match each other or the outer shape and the selected side of the component do not interfere with each other, determining whether all sides of the component are selected, when it is determined that all sides of the component are selected, determining that the component does not make contact, and when it is determined that all sides of the component are not selected, selecting one of the other sides which is not selected.

* * * * *

UNITED STATES PATENT AND TRADEMARK OFFICE
CERTIFICATE OF CORRECTION

PATENT NO. : 8,717,350 B2  Page 1 of 1
APPLICATION NO. : 12/453122
DATED : May 6, 2014
INVENTOR(S) : Takayuki Tokumaru It is certified that error appears in the above-identified patent and that said Letters Patent is hereby corrected as shown below:

In the Claims:

Column 12, Line 36, in Claim 1, delete "parallelpiped" and insert -- parallelepiped --, therefor.
Column 12, Line 37, in Claim 1, delete "parallelpiped" and insert -- parallelepiped --, therefor.
Column 12, Line 43, in Claim 1, delete "parallelpiped" and insert -- parallelepiped --, therefor.
Column 13, Line 34, in Claim 4, delete "parallelpiped" and insert -- parallelepiped --, therefor.
Column 13, Line 35, in Claim 4, delete "parallelpiped" and insert -- parallelepiped --, therefor.
Column 13, Line 42, in Claim 4, delete "parallelpiped" and insert -- parallelepiped --, therefor.
Column 14, Line 21, in Claim 5, delete "parallelpiped" and insert -- parallelepiped --, therefor.
Column 14, Line 22, in Claim 5, delete "parallelpiped" and insert -- parallelepiped --, therefor.
Column 14, Line 29, in Claim 5, delete "parallelpiped" and insert -- parallelepiped --, therefor.

Signed and Sealed this
Twenty-second Day of July, 2014

Michelle K. Lee
*Deputy Director of the United States Patent and Trademark Office*